United States Patent Office 3,794,698
Patented Feb. 26, 1974

3,794,698
POLYETHYLENE CONTAINING EXTRUSION
COATING COMPOSITIONS
Juan C. Diaz and Robert A. Mears, Longview, Tex.,
assignors to Eastman Kodak Company, Rochester, N.Y.
No Drawing. Continuation-in-part of application Ser. No. 74,928, Sept. 23, 1970. This application Mar. 9, 1972, Ser. No. 233,290
The portion of the term of the patent subsequent to Oct. 24, 1989, has been disclaimed and dedicated to the Public
Int. Cl. C08f 29/12
U.S. Cl. 260—897 R    27 Claims

ABSTRACT OF THE DISCLOSURE

Polyethylene containing extrusion coating compositions having an improved balance of properties are obtained from a blend of polyethylene and DAC-B resin. These extrusion coating compositions provide compositions that can be applied to various substrates at reduced melt temperatures with good adhesion between the coating and the substrate and have substantially no imperfections in the coating.

---

This application is a continuation-in-part of application Ser. No. 74,928 filed Sept. 23, 1970, now U.S. Pat. 3,652,725.

This invention relates to a polyethylene containing extrusion coating compositions providing extrusion coatings having an unexpected and improved combination of properties. One aspect of this invention relates to a novel polyethylene containing blend capable of providing extrusion coatings having an improved balance of physical properties. Another aspect of this invention is a polyethylene containing extrusion coating composition capable of providing extrusion coatings having improved adhesion and stability.

Extruding a coating of a polyolefin onto a substrate, such as paper, to form an extrusion coated substrate is well known in the art. Various polyethylenes and blends of polyethylenes have been widely used as extrusion coating compositions. These compositions form coatings having poor abrasion and heat resistance, as well as poor barrier properties. In order to improve the coating properties, blends of polyethylene and polypropylene were used as extrusion coating compositions. Note, for example, U.S. Pat. 3,418,396 which describes and claims blends of polypropylene and polyethylene having improved extrusion coating properties. Although these blends are useful in many applications, they have the disadvantage in that in order to obtain adequate adhesion to many substrates, these prior art blends must be extrusion coated at such a high melt temperature that degradation and/or crosslinking of the polymer blend occurs. This results in unacceptable coatings due to various imperfections in the coatings such as gels, streaks and discoloration. This problem is compounded when the blends contain pigments, such as titanium dioxide, as the pigment adversely affects the adhesion and appears to accelerate the degradation and/or crosslinking of the polymer. If the extrusion coating melt temperature is lowered sufficiently to eliminate the imperfection in the coating, poor adhesion is obtained. Therefore, it would be an advance in the state of the art to provide polyethylene containing extrusion coating compositions that could be applied at low temperatures and have good adhesion to the substrate.

It is, therefore, an object of the present invention to provide a novel polyethylene containing extrusion coating composition.

Another object of the invention is to provide an extrusion coating composition containing polyethylene which provides a coating having an improved balance of physical properties.

Another object of this invention is to provide an extrusion coating composition containing polyethylene which provides coatings having, in addition to other desirable physical properties, good adhesion and stability.

Further objects of the invention will be apparent from the following description of this invention.

In accordance with this invention, polyethylene containing extrusion coating compositions having an improved balance of properties are obtained from a blend of polyethylene and DAC-B resin. These extrusion coating compositions provide compositions that can be applied to various substrates at reduced melt temperatures with good adhesion between the coating and the substrate and have substantially no imperfections in the coating.

The polyethylenes can be any of the normally solid polyethylenes having a melt index at 190° C. of about 0.5–50, preferably 2–20, and a density greater than 0.910 g./cc. In extrusion coating compositions having the most desirable extrusion coating characteristics, the polyethylene has a melt index recovery greater than 50%, preferably greater than 65%.

These polyethylenes are prepared by processes well known in the art. For example, polyethylenes with densities up to about 0.945 are prepared by polymerizing ethylene at pressures greater than 500 atmospheres in the presence of peroxide catalysts. Higher density polyethylenes are prepared, for example, in lower pressure processes with the use of Ziegler and Phillips type catalysts. Blends of polyethylenes prepared by the same or different processes can be used. The amount of DAC-B hydrocarbon resin contained in the blends of this invention can vary from about 0.5 to about 30 weight percent based on the total weight of the blend, with the preferred range being 1 to 20 weight percent to provide coatings having good adhesion.

The DAC-B hydrocarbon resin is a hydrocarbon resin prepared by polymerizing DAC-B (debutanized aromatic concentrate B). DAC-B hydrocarbon resin is a complex mixture of saturated and olefinically unsaturated hydrocarbons obtained from the thermal cracking of a hydrocarbon stream to produce ethylene and/or propylene. The preparation and analysis of one such suitable DAC-B hydrocarbon resin and polymer prepared therefrom is described in U.S. Pat. 3,437,629. One such preferred resin has a softening point of about 135° C., a Gardner color of less than 5, less than 3 p.p.m. chlorides and less than 1% unsaturation (c=c) and can be prepared by polymerizing DAC-B hydrocarbon resin using aluminum chloride as a catalyst in a two-stage reaction system wherein the polymerization is conducted at a temperature of about 50° to 100° C. in the first stage for about 6–10 hours and subsequently polymerized in the second stage at a temperature of about 125° C. to 150° C. for about 6–10 hours. A solution is obtained containing a high softening point crude resin in good yields. The chlorides are removed from the resin solution by methanol extraction or high temperature lime treatment. This treatment is followed by low pressure hydrogenation at hydrogen pressure of 100–1000 p.s.i.g. and/or alumina treatment, followed by high pressure-high temperature hydrogenation at hydrogen pressures of 3,000–6,000 p.s.i.g. and a temperature greater than 300° C. to remove color and reduce unsaturation. Thereafter, the resin solution is stripped to obtain a low color, color stable, high softening point hydrocarbon resin in good yields. This process is further described in U.S. application Ser. No. 67,333 filed Aug. 27, 1970 by Hugh J. Hagemeyer, Jr., Sam H. Johnson, Jr., and Harold E. Hogan entitled Light-Colored, High Softening Point Hydrocarbon Resins and Method For Their Preparation.

The blends of this invention, in addition to DAC-B hydrocarbon resin and polyethylene, may contain as a third component pigments such as titanium dioxide. The amount of pigment contained in the blends will depend on the particular end use but will generally vary between about 1 and 20 weight percent based on the total weight of the blends. The blends may also contain minor amounts of additives such as stabilizer systems, slip agents, colorants, and the like.

The blends of this invention are particularly useful in the photographic industry where polyethylenes containing pigments such as titanium dioxide are used for extrusion coating of special paper substrates. These coated papers are subsequently used in photographic processes such as the making of prints, and, therefore, substantially no imperfections in the coatings can be tolerated. However, with prior extrusion coating compositions, the melt temperature necessary to obtain adequate adhesion to the substrate was so high (620–650° F.) that surface imperfections in the coating were constantly a problem. If the extrusion melt temperature is lowered to 520–580° F. where the film imperfections are not a problem, then very little or no adhesion is obtained between the film and the substrate.

The present invention provides polyethylene containing blends which allow the extrusion coating of both natural and pigmented blends at lower extrusion melt temperatures of less than 600° F., such as 520–580° F., with adequate adhesion between the film and the paper substrate and without the film imperfections in coatings made at 620–650° F.

Another advantage of the present invention is that it allows the use of other pigments, such as Du Pont's R–992 a titanium dioxide pigment, which are more desirable in the photographic industry because of increased opacity with reduced levels of the pigment. Polyethylenes containing Du Pont's 9–992 pigment which are extrusion coated at normal melt temperatures produce totally unacceptable coatings due to streaking caused by moisture. It is not moisture absorbed by the pigment, but in fact waters of hydration contained in the pigment. The elevated melt temperatures drive out the waters of hydration from the pigment which creates an unacceptable bond between the film and substrate and discoloration of the pigment.

An additional and unexpected advantage of the blends of our invention is that coatings prepared from these blends have improved resistance to degradation in the presence of light when compared to prior extrusion coating compositions. This is particularly advantageous in pigmented blends used in preparing photographic papers since these papers are used for photographic prints and long term stability in the presence of daylight is necessary.

The following ASTM procedures were used in determining various properties of the blends of the present invention:

Melt index _____ ASTM D1238–62T
Melt index recovery _____ ASTM D1238–62T
Density (annealed) _____ ASTM D1505–57T
Ring and ball softening point _____ ASTM E–28–58T All measurements were made in conformance with ASTM D–374.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following blends were made by tumbling the components in a drum tumbler for 30 minutes and then homogenizing at a melt temperature of 175° C. in a 2½-inch Hartig extruder using one 24 x 24 and one 100 x 100 screen pak. A standard screw was used, modified slightly to provide water cooling in the feed zone of the screw to prevent the DAC–B hydrocarbon resin from melting in the feed zone. Maximum throat cooling water was used to prevent a bridging of the DAC–B hydrocarbon resin in the extruder throat which in turn could starve feed the screw. The polyethylene had a melt index of 7.0, a density of 0.917, and a melt index recovery of 68%. The DAC–B hydrocarbon resin had a ring and ball softening point of 130° C.

WEIGHT PERCENT IN BLEND

|  | Polyethylene | DAC-B hydrocarbon resin |
| --- | --- | --- |
| Control | 100 |  |
| Blend: |  |  |
| A | 97.5 | 2.5 |
| B | 95 | 5.0 |

The blends and the control were evaluated in the following manner:

Each was fed to a 3½-inch Egan extruder having a barrel length to diameter ratio of 24:1. The four zones of the extruder were maintained from back to front at 400, 500, 580 and 620° F. A metering type screw having six feed flights, six compression flights, and 12 metering flights was used. Prior to entering the die, the melt passed through one screen 14 x 88 mesh. The die was an Egan die center fed with ⅛-inch long lands with an opening of 16 x 0.020 inches. The melt temperature was held constant at 580° F. The extrusion rate was held constant at 160±5 pounds per hour. The resulting film extrudate was passed through a 4½-inch air gap into the nip formed by a rubber covered pressure roll and a chill roll. At the same time a special clay coated substrate (such as Kodak 504 stock) was fed into this nip with the pressure roll in contact with the substrate; the nip pressure applied was 110 pounds per linear inch. The chill roll was a 24-inch diameter matte finish steel roll water cooled to maintain a temperature of 65° F. on the surface of the chill roll. The paper was taken off the chill roll at a point 180° from the nip formed by the pressure roll and chill roll. The chill roll was operated at 400 feet per minute applying a 1-mil thick coating to the substrate. A 1-mil thick coating was also applied in the same manner to 22-pt. milk carton stock.

The coatings were rated for adhesion in the following manner:

A strip of ½-inch wide cellophane tape is applied to the coating. The tape is then pulled from the coating. If the coating does not adhere to the tape, adhesion is rated as good. If the coating is separated from the substrate by the tape and if other than surface fibers from the substrate adhere to the coating, adhesion is rated good. If the coating is separated from the substrate with only surface fibers adhering to the coating, the sample is rated fair adhesion. If the coating is separated from the substrate without any fibers adhering to the coating, the sample is rated no adhesion.

Adhesion rating:
 Control—Fair.
 Blend A—Good.
 Blend B—Good.

EXAMPLE 2

A medium density polyethylene (0.935 g./cc., melt index=8.0 g./10 minutes) pigmented with 10 percent titanium dioxide and 0.82 percent of colorants[1] and ---
[1] Colorants are colored pigments which provide a desired color as, for example, a mixture of 0.62% Raspberry Violet V8295 made by Ferro Corporation and 0.20% Cobalt Blue made by Shepherd Chemical Company.

containing about 1% by weight of the stabilizer system comprising 0.11% tetrakis[methylene (3,5-ditertbutyl-4-hydroxy-hydrocinnamate) methane]; 0.11% substituted 2-benzyl-thio-imidazol; 0.25% poly[4,4'-isopropylidene dicyclohexanol pentaerythritol phosphite]; and 0.5% 2,2'-thiobis-(4-tertiary octyl phenylato)-n-butylamine was extruded onto a photographic paper at a polymer melt temperature of 578° F. At this melt temperature normal unstabilized polyethylene of this same type adheres readily to the stock but this stabilized polyethylene did not adhere. Higher melt temperatures can often be used to improve adhesion but with this stabilized resin a gray discoloration occurred even at 578° F. indicating either a reaction between stabilizers or thermal degradation. Therefore, higher temperatures with the stabilized resin were impossible.

To this same polyethylene formulation 3% DAC–B hydrocarbon resin (3 parts by weight of DAC–B hydrocarbon resin to 97 parts by weight of the above polyethylene formulation) was added and extrusion coated onto paper at a melt temperature of 578° F. With the DAC–B hydrocarbon resin present, not only was good adhesion to the paper obtained but also no discoloration of the resin was evident.

The stabilizers are necessary to provide adequate polyethylene stability and the DAC–B hydrocarbon resin is necessary to provide adequate adhesion to the paper. Other stabilizers can also be used in place of the above stabilizer system, such as for example, octadecylester of 3,5-ditertiary butyl-4-hydroxy hydrocinnamate or stearated oleolyamide.

EXAMPLE 3

A medium density polyethylene (0.935 g./cc. melt index=8.0 g./10 minutes) was compounded with 10% by weight of titanium dioxide, 0.10% tetrakis-methylene (3,5 - di - tert-butyl-4-hydroxyhydrocinnamate) methane, and 3.0% DAC–B hydrocarbon resin. The resulting composite resin was then extruded into 4-mil thick film. Samples of the film were then exposed to daylight fluorescent tube illumination at a level of 400 foot-candles at 50° C., 35% relative humidity for 14 and 28 days continuously. Tensile tests were then performed on the samples on an Instron Tensile Tester, and the area under the stress-strain curve from zero load to sample fracture was recorded. Results were as follows:

|  | Area at start | Percent retained after— | |
|---|---|---|---|
|  |  | 14 days | 28 days |
| Sample with DAC–B hydrocarbon resin | 1,677 | 89.4 | 88.5 |
| Control (same but no DAC–B hydrocarbon resin) | 1,628 | 56.4 | 8.35 |

This shows that the sample with the DAC–B hydrocarbon resin retained most of its strength after the exposure period while the control had lost most of its strength.

The extrusion coating compositions of the present invention can be extrusion coated onto substrates such as paper and paperboard. The coated substrates can be used in applications such as food trays, bags or packages for greasy materials such as dog food, potato chips, release papers and the like. One particular application for the coatings is the use of an extrusion coated paperboard as a food tray for packaging meals such as lunches which, prior to serving, can be quickly heated by a radiation device such as a micro wave range or oven. These compositions, therefore, provide very thin extrusion coatings having good abrasion and heat resistance, excellent adhesion to the substrate and good barrier properties.

The invention has been described in detail with particular reference to preferred embodiments thereof, but it will be understood that variations and modifications can be effected within the spirit and scope of the invention.

We claim:

1. A polyethylene containing extrusion coating composition capable of being extruded onto a substrate at temperatures of less than 600° F. to provide extrusion coatings having good adhesion and stability comprising a polymeric blend consisting essentially of about 99.5 to 70 weight percent polyethylene having a melt index at 190° C. of about 0.5 to 50, a density greater than 0.910 g./cc. and a melt index recovery of greater than 50%, and about 0.5 to about 30 weight percent of DAC–B hydrocarbon resin prepared by polymerizing DAC–B.

2. The polyethylene containing extrusion coating composition according to claim 1 containing 1 to 20 weight percent pigment.

3. A coated substrate which comprises a substrate having an extrusion coating thereon comprising a blend of about 99.5 to 70 weight percent polyethylene having a melt index at 190° C. of about 0.5 to 50, a density greater than 0.910 g./cc. and a melt index recovery of greater than 50% and about 0.5 to about 30 weight percent of DAC–B hydrocarbon resin prepared by polymerizing DAC–B.

4. A coated substrate according to claim 3 wherein said substrate is paper.

5. A method for coating a substrate with an extrusion coating composition which provides coatings having good adhesion to the substrate which comprises extrusion coating onto said substrate at an extrusion coating temperature of less than 600° F. an extrusion coating composition comprising a blend of about 99.5 to about 70 weight percent polyethylene having a melt index at 190° C. of about 0.5 to 50, a density greater than 0.910 g./cc. and a melt index recovery of greater than 50% and about 0.5 to about 30 weight percent of DAC–B hydrocarbon resin prepared by polymerizing DAC–B.

6. An extrusion coating composition according to claim 2 wherein said pigment is titanium dioxide.

7. An extrusion coating composition according to claim 6 containing a stabilizer.

8. The polyethylene containing extrusion coating composition according to claim 7, wherein said stabilizer is tetrakis-methylene (3,5-di-tert-butyl - 4 - hydroxyhydrocinnamate)methane.

9. An extrusion coating composition capable of being extruded onto a substrate at temperatures of less than 600° F. to provide extrusion coatings having good adhesion and stability comprising a blend consisting essentially of about 99 to 80 weight percent polyethylene having a melt index at 190° C. of about 2 to 20, a density greater than 0.910 g./cc. and a melt index recovery greater than 65%, and about 1 to about 20 weight percent of hydrocarbon resin prepared by polymerizing DAC–B.

10. An extrusion coating composition according to claim 9 containing 1 to 20 weight percent pigment.

11. An extrusion coating composition according to claim 10 wherein said pigment is titanium dioxide.

12. An extrusion coating composition according to claim 9 containing a stabilizer.

13. An extrusion coating composition according to claim 12 wherein said stabilizer is tetrakis-methylene(3,5-di-tert-butyl-4-hydroxy-hydrocinnamate) methane.

14. A coated substrate according to claim 3 wherein said extrusion coating contains 1 to 20 weight percent pigment.

15. A coated substrate according to claim 14 wherein said pigment is titanium dioxide.

16. A coated substrate according to claim 3 wherein said extrusion coating contains stabilizer.

17. A coated substrate according to claim 16 wherein said stabilizer is tetrakis-methylene(3,5-di-tert-butyl-4-hydroxy-hydrocinnamate) methane.

18. A coated substrate according to claim 14 wherein said extrusion coating contains stabilizer.

19. A coated substrate according to claim 18 wherein said substrate is paper.

20. A coated substrate which comprises a substrate having an extrusion coating thereon comprising a blend of about 99 to 80 weight percent polyethylene having a melt index at 190° C. of about 2 to 20, a density greater than 0.910 g./cc. and a melt index recovery of greater than 65% and about 1 to about 20 weight percent of DAC–B hydrocarbon resin prepared by polymerizing DAC–B.

21. A coated substrate according to claim 20 wherein said extrusion coating contains 1 to 20 weight percent pigment.

22. A coated substrate according to claim 21 wherein said pigment is titanium dioxide.

23. A coated substrate according to claim 22 wherein said extrusion coating contains stabilizer.

24. A coated substrate according to claim 23 wherein said stabilizer is tetrakis-methylene(3,5-di-tert-butyl-4-hydroxy-hydrocinnamate) methane 25. A coated substrate according to claim 24 wherein said substrate is paper.

26. A method for coating a substrate with an extrusion coating composition which provides coatings having good adhesion to the substrate which comprises extrusion coating onto said substrate at an extrusion coating temperature of less than 600° F. an extrusion coating composition comprising a blend of about 99 to about 80 weight percent polyethylene having a melt index at 190° C. of about 2 to 20, a density greater than 0.910 g./cc. and a melt index recovery of greater than 65% and about 1 to about 20 weight percent of DAC–B hydrocarbon resin prepared by polymerizing DAC–B.

27. A method according to claim 26 wherein said substrate is paper.

References Cited

UNITED STATES PATENTS

| | | | |
|---|---|---|---|
| 3,148,059 | 9/1964 | Brunson et al. I | 96—27 |
| 3,247,142 | 4/1966 | Brunson et al. II | 260—23 |
| 3,437,629 | 4/1969 | Von Bramer et al. | 260—31.8 |
| 3,418,396 | 12/1968 | Edwards et al. | 260—897 |
| 3,652,725 | 3/1972 | Diaz et al. | 260—876 B |
| 3,700,758 | 10/1972 | Johnson et al. | 260—897 R |

MURRAY TILLMAN, Primary Examiner

C. J. SECCURO, Assistant Examiner

U.S. Cl. X.R.

117—155 UA; 260—41 B, 41 C, 45.8 NZ, 45.85 B, 45.7 P, 45.9 R, 897 A